United States Patent Office 3,132,182
Patented May 5, 1964

---

3,132,182
PROCESS FOR THE PRODUCTION OF TRIFLUORO-METHYL-MERCAPTO PHENOLS
Hans Richert, Leverkusen, Germany, assignor to Farbenfabriken Bayer Aktiengesellschaft, Leverkusen, Germany, a corporation of Germany
No Drawing. Filed Oct. 22, 1962, Ser. No. 232,299
Claims priority, application Germany Nov. 3, 1961
6 Claims. (Cl. 260—609)

4-trifluoro-methylmercapto phenol has already been described by L. M. Yagupolsky and M. S. Marenets (see J. Allge. Chem. 24, 887 (1954)). According to this literature it is obtained by diazotizing and boiling 4-trifluoromethylmercapto aniline. The latter is obtained according to F. Muller, O. Scherrer and W. Schumacher (see U.S. patent specification No. 2,108,606) by fluorination of 1-nitro-4-trifluoro-methylmercapto benzene and subsequent reduction.

It has now been found that the obtaining of this phenol and further trifluoro-methylmercapto phenols of the general formula

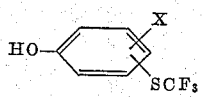

(X is hydrogen or a substituent of the benzene nucleus; X preferably stands for alkyl groups having 1 to 4 carbon atoms, the hydroxy group, the nitro group and halogen, especially bromine and chlorine), is possible in the following simple and elegant manner.

According to the invention these compounds are obtained by introducing trifluoromethylsulphenyl chloride into the corresponding phenols at 0–200° C., preferably at 80–100° C., in the presence or absence of Friedel-Crafts catalysts with or without the addition of inert solvents.

The trifluoro-methylsulphenyl chloride can readily be obtained according to C. W. Tullock (see U.S. patent specification 2,884,453) from perchloromethyl mercaptan and sodium fluoride in tetramethylene sulphone and purified by distillation. It is preferably applied with 80–90% purity. The main impurity, bis-trifluoro-methyl disulphide, takes no part in the reaction.

The trifluoro-methylmercapto phenols are primarily valuable starting materials for the production of particular phosphoric acid esters with insecticidal activity.

The following examples are given for the purpose of illustrating the invention:

Example 1

50 g. (0.53 mol) of phenol are dissolved in 30 ml. of chlorobenzene and mixed with 20 g. of ferric chloride (anhydrous, sublimed). Into the well-stirred slurry, 27 g. (about 0.16 mol) of approx. 80% trifluoro-methylsulphenyl chloride are introduced at room temperature in the course of 3½ hours. This is followed by heating to 50° C. for an hour. After cooling it is shaken with 100 ml. of water several times, dried over sodium sulphate and fractionally distilled. Besides chlorobenzene and unreacted phenol there are obtained 12 g. of colourless, crystalline trifluoro-methylmercapto phenol. B.P. 211–212° C. at 746 mm. Hg, B.P. 110° C. at 15.5 mm. Hg, M.P. 56–59° C. Yield about 30% of the theoretical calculated on trifluoro-methylsulphenyl chloride.
Analysis:

|  | Calculated | Found |
|---|---|---|
| Percent F | 29.4 | 28.5 |
| Percent S | 16.5 | 17.2 |
| Mol Wt | 194 | 196 |

Example 2

Into a solution of 500 g. (5.3 mols) of phenol in 350 ml. of chloro-benzene, 220 g. (about 1.45 mols) of about 90% trifluoro-methylmercapto-sulphenyl chloride are introduced at 80–90° C. in the course of 3 hours. The hydrogen chloride evolved is led off at —78° C. through a cooler, whereupon about 30 g. of unreacted trifluoromethylsulphenyl chloride condense. To expel the hydrogen chloride the reaction is heated on the water bath for an hour in a current of nitrogen. It is then fractionally distilled. 179 g. of a fraction are obtained which boils between 185 and 211° C. and consists of about equal parts of phenol and 4-trifluoro-methylmercapto phenol, and 73 g. 4-trifluoro-methylmercapto phenol as well; B.P. 99–99.5° C. at 13.5 mm. Hg, M.P. 58–59° C. Yield of pure product in relation to trifluoro methylsulphenyl chloride used, about 26%.

Example 3

107 g. (about 0.63 mol) of about 80% trifluoro-methylsulphenyl chloride are introduced into 100 g. (0.93) of o-cresol at about 80° C. The unreacted trifluoro-methylsulphenylchloride is collected in a receiver and used again. The further operation proceeds as described in Example 2.

70 g. of a weakly reddish coloured viscous liquid are obtained; B.P. 106° C. at 13.2 mm. Hg. The substance is identified by the infra red spectrum as 2-methyl-4-trifluoromethylmercapto phenol. Yield about 53% of the theoretical.
Analysis:

|  | Calculated | Found |
|---|---|---|
| Percent F | 27.4 | 27.6 |
| Percent S | 15.4 | 16.0 |
| Mol wt | 208 | 208/227 |

Example 4

According to the instructions given in Example 3, 165 g. (1.54 mols) of m-cresol are reacted with 165 g. (about 1.1 mols) of about 90% trifluoro-methylsulphenyl chloride. 154 g. of a weakly yellowish viscous liquid are obtained; B.P. 114.5° C. at 15 mm. Hg. By the infra red spectrum the substance is identified as 3-methyl-4-trifluoro-methylmercapto phenol, yield about 67% of the theoretical.
Analysis:

|  | Calculated | Found |
|---|---|---|
| Percent F | 27.4 | 26.8 |
| Percent S | 15.4 | 15.6 |
| Mol wt | 208 | 202/229 |

As by-product about 5 g. of a white crystalline substance is obtained with a peppermint taste; B.P. 78° C. at 14 mm. Hg. According to gas chromatogram it consists of a number of phenols; the main component (76%) is identified by infra red spectrum as 3-methyl-6-trifluoromethylmercapto phenol.

Example 5

Corresponding to the instructions of Example 3, 200 g. (1.55 mols) of m-chlorophenol are reacted with 150 g. (about 0.88 mol) of approx. 80% trifluoro-methylsulphenyl chloride. 90 g. of green-yellow crystals are obtained; M.P. 43° C.; B.P. 122–125° C. at 15 mm. Hg. By the infra red spectrum the substance is identified as 3-chloro-4-trifluoro-methylmercapto phenol. The gas chromatogram shows 5% impurities (4% m-chlorophenol). Yield about 42% of the theoretical.

Analysis:

| | Calculated | Found |
|---|---|---|
| Percent F | 24.9 | 24.2 |
| Percent Cl | 15.5 | 16.0 |
| Percent S | 14.0 | 13.9 |
| Mol wt | 228.5 | 227/250 |

As by-product 14 g. of a colourless liquid of peppermint taste are obtained; B.P. 85–86° C. at 14 mm. Hg. According to the gas chromatogram the substance consists of about 5% m-chlorophenol and 91% of a compound which was identified from the infra-red spectrum as 3-chloro-6-trifluoromethylmercapto-phenol.

*Example 6*

75 g. (0.44 mol) of about 80% trifluoro-methylsulphenyl chloride are introduced into 150 g. (1.36 mols) of 1,2-dihydroxybenzene at 120–130° C. with stirring. The unreacted trifluoro-methylsulphenyl chloride is collected in a receiver and used again. After reaction is complete the hydrogen chloride is expelled by heating the reaction mixture in a current of nitrogen for about another hour. By recrystallising from benzene a large portion of the unreacted 1,2-dihydroxybenzene is removed. The 1,2-dihydroxy-4-trifluoro-methylmercapto phenol concentrates in the mother liquor and is recovered therefrom by subsequent fractional distillation in vacuum in form of an about 70% mixture with 30 mol percent 1,2-dihydroxybenzene. 63 g. of the 70% mixture correspond to a yield of 51 g. (0.24 mol) of pure 1,2-dihydroxy-4-trifluoro-methylmercapto phenol (54% of the theoretical). The composition is identified by the gas chromatogram and by the infra red spectrum.

The 1,2-dihydroxy-4-trifluoro-methylmercapto phenol can be concentrated up to about 80% by further distillation which brings about a reduction of the yield; B.P. 126–132° C. at 11 mm. Hg; M.P. 55–60° C.

Analysis:

| Gas chromatogram purity | Molecular weight | Sulphur, percent | Content of fluorine, percent |
|---|---|---|---|
| Calculated for 80% | 190 | 12.2 | 21.7 |
| Found 78.1% | 194 | 12.2 | 21.5 |

I claim:
1. Process for the production of trifluoro-methyl-mercapto phenols of the formula

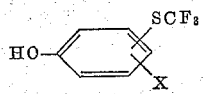

wherein X is a member of the group consisting of hydrogen, hydroxy group, nitro group, chloro group and alkyl group having 1 to 4 carbon atoms, comprising reacting the corresponding phenol reactant with trifluoro-methyl-sulfenyl chloride at a temperature of about 0°–200° C.

2. Process according to claim 1 wherein the reaction is carried out in the presence of an inert solvent.

3. Process according to claim 1 wherein the reaction is carried out in the presence of a Friedel-Craft's catalyst.

4. A process of claim 1 wherein the phenol reactant is a member selected from the group consisting of a dihydroxy benzene, nitrophenol, chlorophenol, alkylphenol having 1 to 4 carbon atoms in the alkyl group, and phenol at a temperature of 80°–100° C.

5. A process of claim 2 wherein the reaction is effected in the presence of a chlorobenzene solvent.

6. A process of claim 3 wherein the catalyst is ferric chloride.

References Cited in the file of this patent

Yagupolski et al., Zhur. Obschii Khim 24, 887–894 (1954), cited in Chemical Abstracts 49, 8172g (1955).